A. GWINN & O. A. HOVICK.
FRYING FRAME.
APPLICATION FILED DEC. 23, 1908.
924,981.
Patented June 15, 1909.
2 SHEETS—SHEET 1.
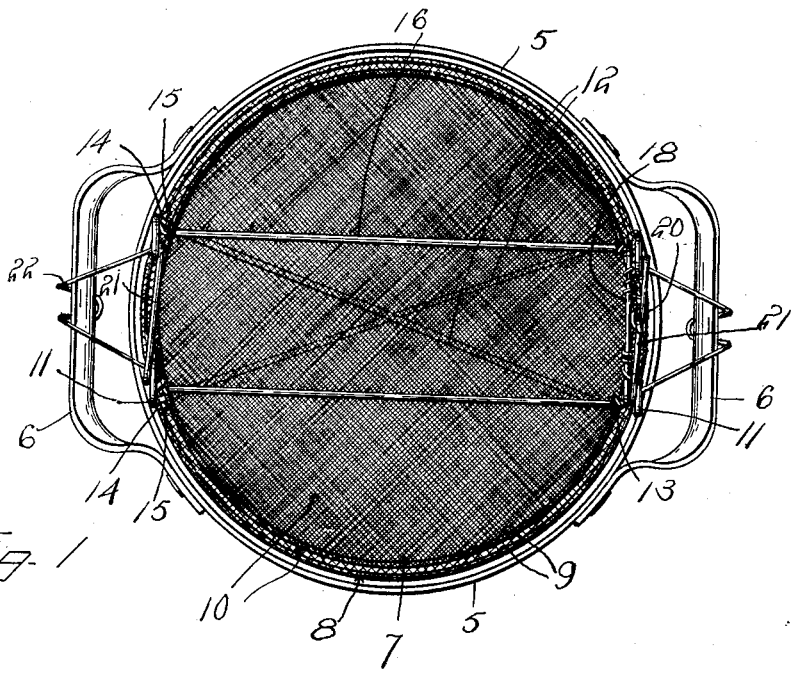
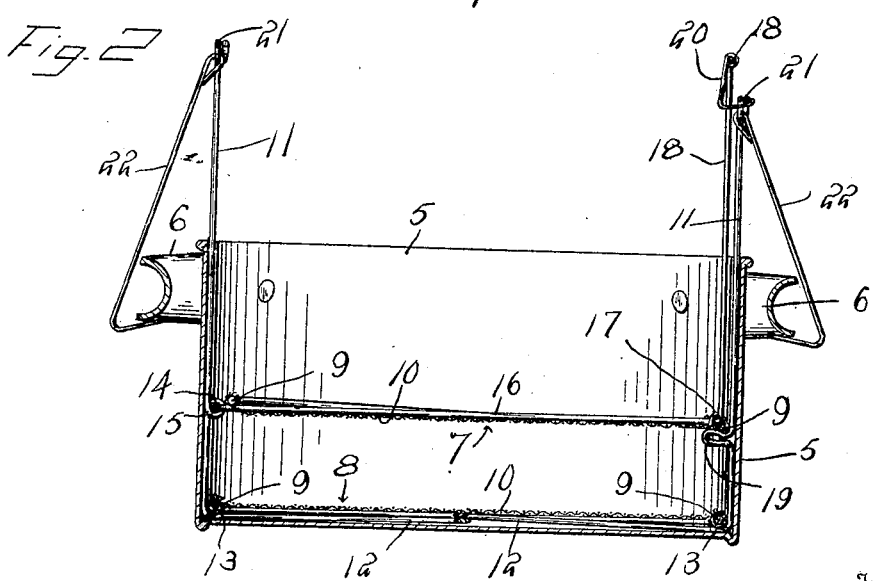
Witnesses
Inventors
Archie Gwinn.
Oscar A. Hovick
By
Attorneys

A. GWINN & O. A. HOVICK.
FRYING FRAME.
APPLICATION FILED DEC. 23, 1908.

924,981.

Patented June 15, 1909.
2 SHEETS—SHEET 2.

Witnesses
J. C. Simpson
G. O. Sander

Inventors
Archie Gwinn.
Oscar A. Hovick.

By

Attorneys

UNITED STATES PATENT OFFICE.

ARCHIE GWINN AND OSCAR A. HOVICK, OF HATTON, NORTH DAKOTA, ASSIGNORS OF ONE-THIRD TO HARRY E. CANFIELD, ONE-THIRD TO ANTON HOVIK, AND ONE-THIRD TO EDWARD NYHUS, ALL OF HATTON, NORTH DAKOTA.

FRYING-FRAME.

No. 924,981.  Specification of Letters Patent.  Patented June 15, 1909.

Application filed December 23, 1908. Serial No. 469,006.

*To all whom it may concern:*

Be it known that we, ARCHIE GWINN and OSCAR A. HOVICK, citizens of the United States, residing at Hatton, in the county of Traill, State of North Dakota, have invented certain new and useful Improvements in Frying-Frames; and we do hereby declare the following to be a full, clear, and exact description of the invention, such as will enable others skilled in the art to which it appertains to make and use the same.

The invention relates to a frying frame and more particularly to the class of cruller frying frames.

The primary object of the invention is the provision of a frying frame by which the material is conveniently held submerged in grease until fried when such material can be readily removed from the grease without danger of a person being burned by contact with the hot grease and upon the removal of the material from the latter it will be drained or freed from surplus grease.

Another object of the invention is the provision of a frying frame which is capable of permitting the quick and easy discharge of the material supported thereby after having been previously submerged in grease to effect the frying of the material.

A further object of the invention is the provision of a frying frame which is firmly held in a secure manner within a receptacle containing grease so that the material is held submerged until fried.

With these and other objects in view the invention consists in the novel construction, combination and arrangement of parts and particularly of a frying frame comprising superposed reticulated disks, the lowermost disk having oppositely disposed vertical handles to one of which is hinged the other disk and the remaining handle is provided with stop or bearing lugs to hold the hinged disk in relative working relation to the other disk as will be hereinafter more fully described in detail, illustrated in the accompanying drawings and brought out in the appended claims.

Figure 3:
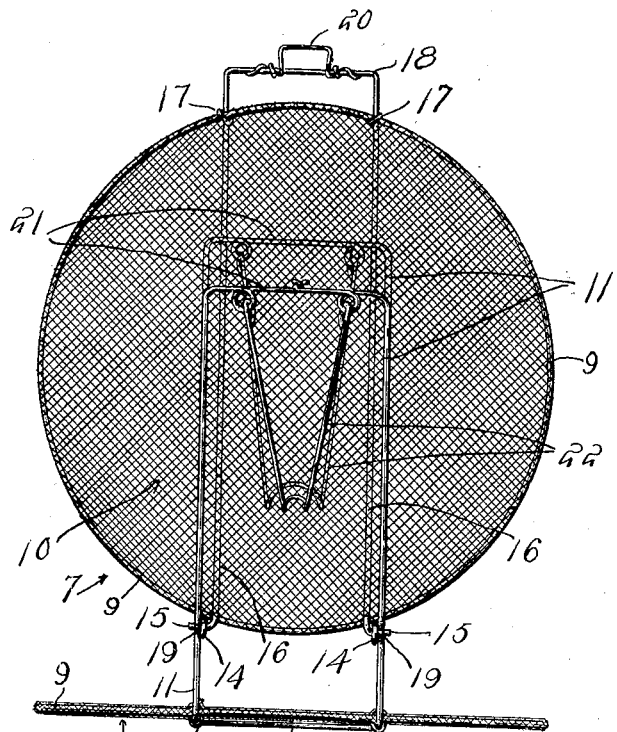
Figure 4:
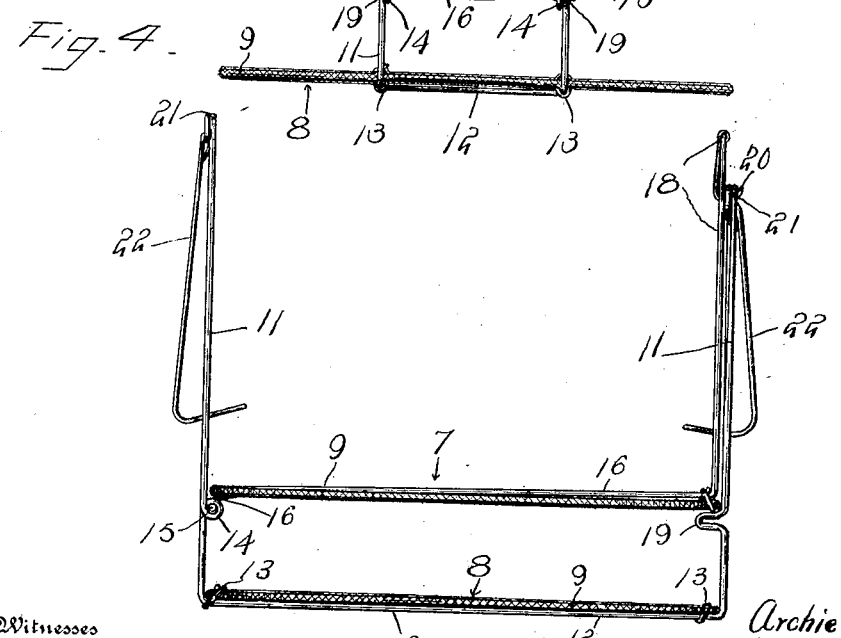

In the drawings: Figure 1 is a top plan view of the receptacle with the invention mounted therein. Fig. 2 is a vertical sectional view through the same. Fig. 3 is an elevation of the frame with the hinged disk swung to an open position, and the frame removed from the receptacle. Fig. 4 is a side elevation with the hinged disk in a closed position.

Similar reference characters indicate corresponding parts throughout the several views in the drawings.

In the drawings, the numeral 5 designates the ordinary cruller receptacle or kettle for containing grease and in which crullers are fried and is provided at diametrically opposite sides with strap handles 6 which latter permit the said kettle to be lifted onto and from a stove, or the like and also the ready and easy handling of the same for transporting from one locality to another.

Within the receptacle or kettle 5 is adapted to be mounted a frying frame which comprises normally superposed reticulated disks or frames 7 and 8 respectively, each formed of an endless wire ring 9 having connected thereto wire mesh forming the base 10 of the frame. The reticulated frame 8 has rising therefrom at diametrically opposite sides vertical inverted U-shaped wire handles 11 which latter are joined to each other by diagonally disposed crossing stay wires 12 which latter extend across the under face of the said frame 8 to reinforce the same and are connected thereto by securing wires 13 which are twisted about the stay wires and the ring 9 of the frame.

At a distance above the reticulated frame 8 and formed in one of the handles 11 are eyes 14 to which is hinged the reticulated frame 7 by the end connections 15 of spaced parallel stay wires 16 disposed across the reticulated member and connected thereto by twisted wire pieces or members 17. The said stay wires 16 are bent to form an inverted U-shaped lifting handle 18 rising from and at right angles to the reticulated frame 7 in superposed relation to the other frame.

Formed in the other handle 11 rising from the frame 8 and in alinement with the eyes 14 are stop or bearing offsets or lugs 19 which latter support the uppermost reticulated frame 7 in superposed parallel relation with the reticulated frame 8 when said upper frame is closed or in a lowered position.

Hinged to the lifting handle 18 is a catch member 20 which latter is adapted to be brought into locked engagment with one of the handles 8 to hold the reticulated frame 7 in a lowered or closed position.

Hinged to the cross connecting pieces 21 of the handles 8 are swinging catch members 22 which latter are adapted to be brought into locked engagement with the handle 6 of the kettle when the frying frame is positioned within the kettle.

The material or crullers are placed upon the lower frame 8 when the upper hinged frame 7 is swung to an open position and then the said latter frame is lowered and locked by the catch member 20 and then the frying frame is placed within the kettle or receptacle 5 to fully submerge the material or crullers in the grease contained in the said kettle or receptacle until they are sufficiently fried. The frying frame is firmly held in the kettle by the catch members 22 engaging the handles thereof.

It is obvious that due to the hinged connection of the superposed reticulated frame it will permit the said frame to be swung to an open position so as to permit ready and easy access to be had to the material supported by the stationary or lowermost frame, as no parts of the frame will be in position to obstruct free accessibility to the material or crullers supported by the frying frame.

What is claimed is—

1. In a device of the class described, upper and lower frames, a handle rising from the lower frame, a hinged connection between said handle and said upper frame to permit the opening of the latter, a second handle rising from the lower frame, a handle rising from the upper frame, and a catch member hinged to one of the latter handles and adapted to engage the other of said handles to lock said upper frame in superposed relation to said lower frame.

2. A frying frame comprising upper and lower reticulated frames, handles rising from the lower frame at diametrically opposite sides thereof, hinged connections between one of said handles and the said upper frame, to permit the opening of the latter, stay wires secured to and extending across the frame, a handle rising from the upper frame, a catch member hinged to said latter handle, and adapted to engage one of the first mentioned handles to lock the said upper frame in superposed relation to the said lower frame; and catch means for securing the frying frame in a receptacle.

In testimony whereof, we affix our signatures in presence of two witnesses.

ARCHIE GWINN.
OSCAR A. HOVICK.

Witnesses:
W. E. O'Haron,
Chas. A. Lyche.